US005392030A

United States Patent [19]
Adams

[11] Patent Number: 5,392,030
[45] Date of Patent: Feb. 21, 1995

[54] LOCOMOTIVE PERSONAL ALERT SYSTEM

[76] Inventor: George W. Adams, 3468 Sandpiper Ct., Hayward, Calif. 94542

[21] Appl. No.: 39,926

[22] Filed: Mar. 29, 1993

[51] Int. Cl.⁶ .............................................. G08B 23/00
[52] U.S. Cl. ...................................... 340/576; 180/272
[58] Field of Search ........................ 340/576, 575, 439; 180/272

[56] References Cited

U.S. PATENT DOCUMENTS

| | | | |
|---|---|---|---|
| 3,610,943 | 10/1971 | Jones | 180/272 X |
| 3,611,344 | 10/1971 | Couper | 340/575 X |
| 3,794,968 | 2/1974 | Hill | 340/576 |
| 3,918,176 | 11/1975 | Abernethy, III et al. | 180/272 X |
| 3,942,151 | 3/1976 | Takeuchi | 340/576 X |
| 4,234,051 | 11/1980 | Morris, Jr. | 180/272 |
| 4,359,725 | 11/1982 | Balogh et al. | 340/576 |
| 5,012,226 | 4/1991 | Love | 340/576 |
| 5,224,566 | 7/1993 | Stepanian et al. | 180/272 |

FOREIGN PATENT DOCUMENTS 2444453 8/1980 France .............................. 340/576

Primary Examiner—John K. Peng
Assistant Examiner—Thomas J. Mullen, Jr.
Attorney, Agent, or Firm—Schneck & McHugh

[57] ABSTRACT

A safety alertness monitoring system for a vehicle which requires the operator to match a randomly generated alpha-numeric character pattern, consisting of a set of characters, presented at random intervals during normal operation of the vehicle. Failure to input the displayed characters via keyboard leads to an audible alarm. If the operator fails to respond to the audible alarm or an unacceptable number of consecutive alarms occur, the vehicle throttle is disabled and the braking system engaged. The system receives input from the vehicle speedometer and is capable of bringing the vehicle to a smooth controlled stop. The system also receives input from sensors that indicate when the vehicle is being remotely operated. The system is disabled when the vehicle is remotely operated.

5 Claims, 3 Drawing Sheets

LOCOMOTIVE PERSONAL ALERT SYSTEM

TECHNICAL FIELD

The invention relates generally to an apparatus for maintaining alertness in vehicle operators and more particularly to an apparatus for maintaining alertness in locomotive operators.

BACKGROUND OF THE INVENTION

Impaired alertness in vehicle operators is a serious problem, particularly in locomotives which travel at a constant rate of speed for extended periods of time. Existing alert systems require the operator to reset a timer at regular intervals in response to a signal light by pressing a button or operating one of the controls. The system must be reset within a specified time period following the visual cue or an audible alarm is sounded. If the system is not reset within a second specified time period following the alarm the train is stopped. The simplicity of the response which resets the system is not indicative of the level of alertness required for safe vehicle operation. An experienced operator is able to reset the system when dozing or otherwise impaired.

Alertness monitoring systems in which a visual cue followed by an audible alarm precedes inactivation of the vehicle are well known. U.S. Pat. No. 3,611,344 to Couper describes a system for initiating conscious activity of a vehicle operator in which a visual alarm signal is automatically and periodically activated. The operator must promptly manually deactivate the visual alarm signal or an audible alarm is generated. If the audible alarm is not promptly manually deactivated the vehicle engine is disabled and an external alarm is initiated.

Devices which require the operator of a vehicle to periodically perform a task in order to prevent activation of an alarm are also known. U.S. Pat. No. 4,234,051 to Morris describes a device in which the operator of a vehicle must increase the quantity in a countdown timer by pressing a reset button. When the countdown timer reaches a predetermined quantity the throttle of the vehicle is switched into an idle position. The operator may selectively control the value by which the quantity in the countdown timer is increased. U.S. Pat. No. 5,012,226 to Love describes an operator alertness 10 device which requires that a switch be operated within an adjustable time period to prevent activation of a first visual alarm. Failure to operate the switch within a second time period results in sounding of a second audible alarm which remains activated until the switch is operated.

Devices which compare some quality of the operator's response to a standard are also known. U.S. Pat. No. 4,359,725 to Balogh et al. describes a system for monitoring the alertness of the driver of a vehicle by prompting the driver with an auditory cue, then briefly lighting one of the turn signal indicator lamps on the instrument board and measuring the time it takes the driver to switch the corresponding turn signal control on and off. If the driver fails to respond, or the response time has deteriorated sufficiently, an alarm is given. U.S. Pat. No. 3,794,968 to Hill describes a system for testing fitness to drive a motor vehicle in which a subject must turn a knob at a time varying rate to match a hidden signal which varies at a predictable non-uniform rate. The subject is given cues which are limited to whether the rate at which the knob is turning is greater or less than the signal change rate. The system is not designed to be used during operation of a vehicle.

The prior art devices for use during operation of a vehicle do not require the operator to perform a task sufficiently complicated to reliably indicate a safe level of alertness. The operator of a vehicle must be able to evaluate complex visual information and respond appropriately to variable situations.

It is therefore an object of the invention to provide an improved alertness monitoring system which requires an operator to uniquely respond to variable visual cues.

It is a further object to provide an improved alertness monitoring system which presents visual cues in an unpredictable manner.

It is a further object to provide an improved alertness monitoring system capable of sensing a vehicle's speed and bringing it to a smooth, controlled stop.

SUMMARY OF THE INVENTION

The present invention tests the alertness of the vehicle operator by displaying a randomly selected visual symbol pattern, such as a set of alpha-numeric characters, which the operator must repeat from a keyboard within a set time period. The pattern is displayed on a screen or projected on the vehicle windshield at randomly selected intervals during normal train operation. If the displayed numbers are not entered within a set time period an audible alarm is sounded and the operator is given an additional set time period within which to enter the numbers correctly. If the correct numbers have not been entered at the end of the second time period the system disables the throttle and engages the brakes. The system also includes an alarm event counter which disables the throttle and engages the brakes if a preset number of consecutive alarms occur. The alarm event counter is reset to zero when the system is first enabled and every time the correct numbers are entered before the audible alarm is sounded. The system includes a speedometer sensor. When the vehicle has been in continuous forward motion for a set period of time the system is enabled. Input from the speedometer is also utilized by the system to apply the brakes in a controlled manner so that the vehicle is brought to a smooth stop within a specific period of time and distance. The system also includes a pair of sensors for detecting when the vehicle is being remotely operated. When the vehicle is being operated remotely the personal alert system is deactivated.

An advantage of the alertness monitoring system of the present invention is that it requires an operator to uniquely respond to a variable visual cue.

Another advantage is that the alertness monitoring system presents visual cues in an unpredictable manner.

A further advantage is that the alertness monitoring system is capable of sensing the vehicle's speed and bringing it to a smooth, controlled stop.

DETAILED DESCRIPTION OF THE PREFERRED EMBODIMENT

Figure 1:
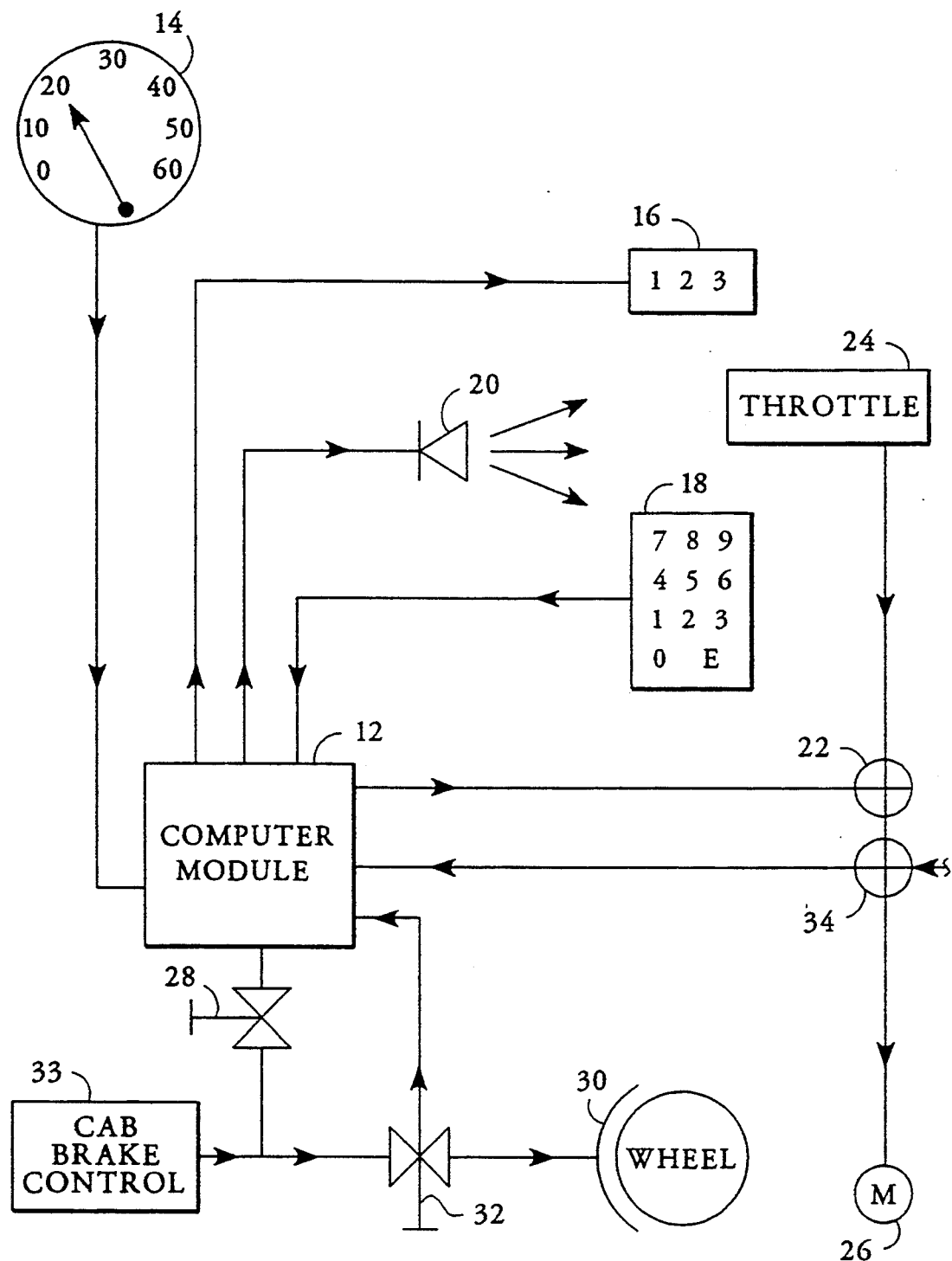
FIG. 1 is a block circuit diagram of the alertness monitoring system of the present invention.

With reference to FIG. 1, a block circuit diagram of an alertness monitoring system 10 of the present invention is shown. A computer module 12 controls the enablement and operation of alertness monitoring system 10. When computer module 12 receives a non-zero input from a vehicle speedometer 14 for a period of time greater than a preset value, a random interval is generated. At the end of the random interval, computer module 12 displays a three-character random alpha-numeric pattern on a screen 16. Numbers are preferred for display because they will not be confused with letters. For example, the letter "I" could be confused with the number "1". Accordingly, all references herein will be to number patterns, but other patterns could also be used. If the random number displayed on screen 16 is not entered via a keyboard 18 within a predetermined time period, computer module 12 sounds an audible alarm 20. If the correct number is not entered via keyboard 18 within a second predetermined time interval following the audible alarm, computer module 12 disables a throttle relay 22 located between a throttle 24 and a traction motor 26. After the throttle relay 22 has been disabled, computer module 12 activates a brake control valve 28 thereby engaging a wheel brake system 30. If the vehicle has not come to a complete stop within a predetermined time period, computer module 12 activates brake valve 28 in emergency mode, which fully engages brake 30, bringing the vehicle to an immediate and complete stop.

The system also includes a pair of sensors for determining when the vehicle is being operated remotely from another cab in multiple unit or "slave" operation. One sensor detects activation of an air brake cut-out valve 32, which disables a cab brake control 33, and the other sensor detects activation of a remote throttle relay 34. Activation of either brake cut-out valve 32 or remote throttle relay 34 deactivates the personal alert system in that vehicle.

Figure 2:
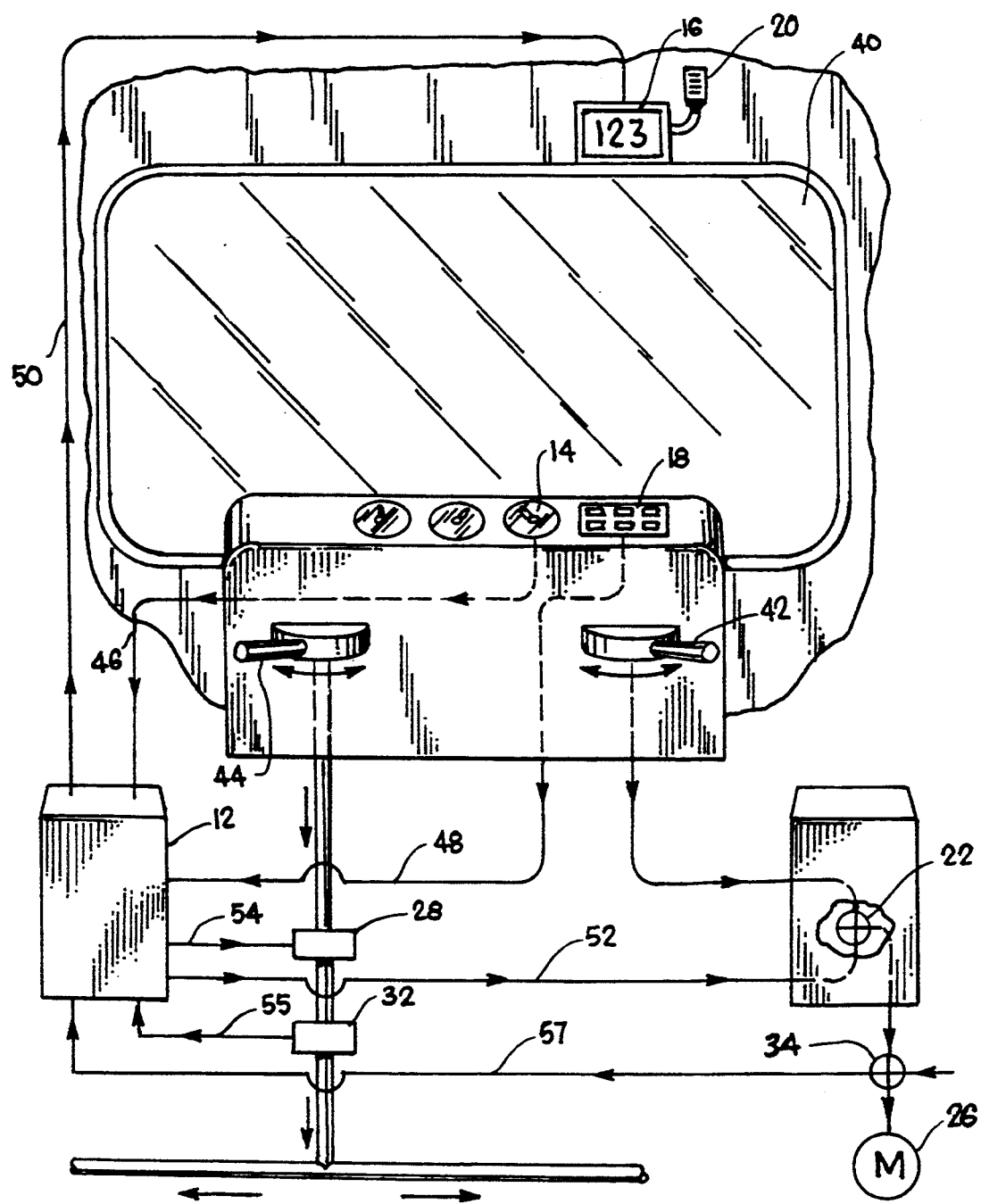
FIG. 2 is a pictorial representation of the alertness monitoring system of FIG. 1 as installed in the cab of a locomotive.

Referring now to FIG. 2, a pictorial representation of alertness monitoring system 10, as installed in the cab of a locomotive, is shown. Display screen 16 is located adjacent to a front windshield 40 which is in the operator's sight line. In alternative embodiments, the random number may be projected directly on windshield 40. Keyboard 18 may be located at any convenient location within reach of a throttle control handle 42 and an air brake handle 44. Computer module 12 receives input from speedometer 14 along a communication line 46 and from keyboard 18 along a communication line 48. Display screen 16 and audible alarm 20 are controlled by computer module 12 via a communication line 50. A pair of communication lines 52 and 54 transmit signals from computer 12 to throttle relay 22 and brake control valve 28, respectively. Computer module 12 also receives deactivating signals from brake cut-out valve 32 along a communication line 55 and from remote throttle relay 34 along a communication line 57.

Figure 3:
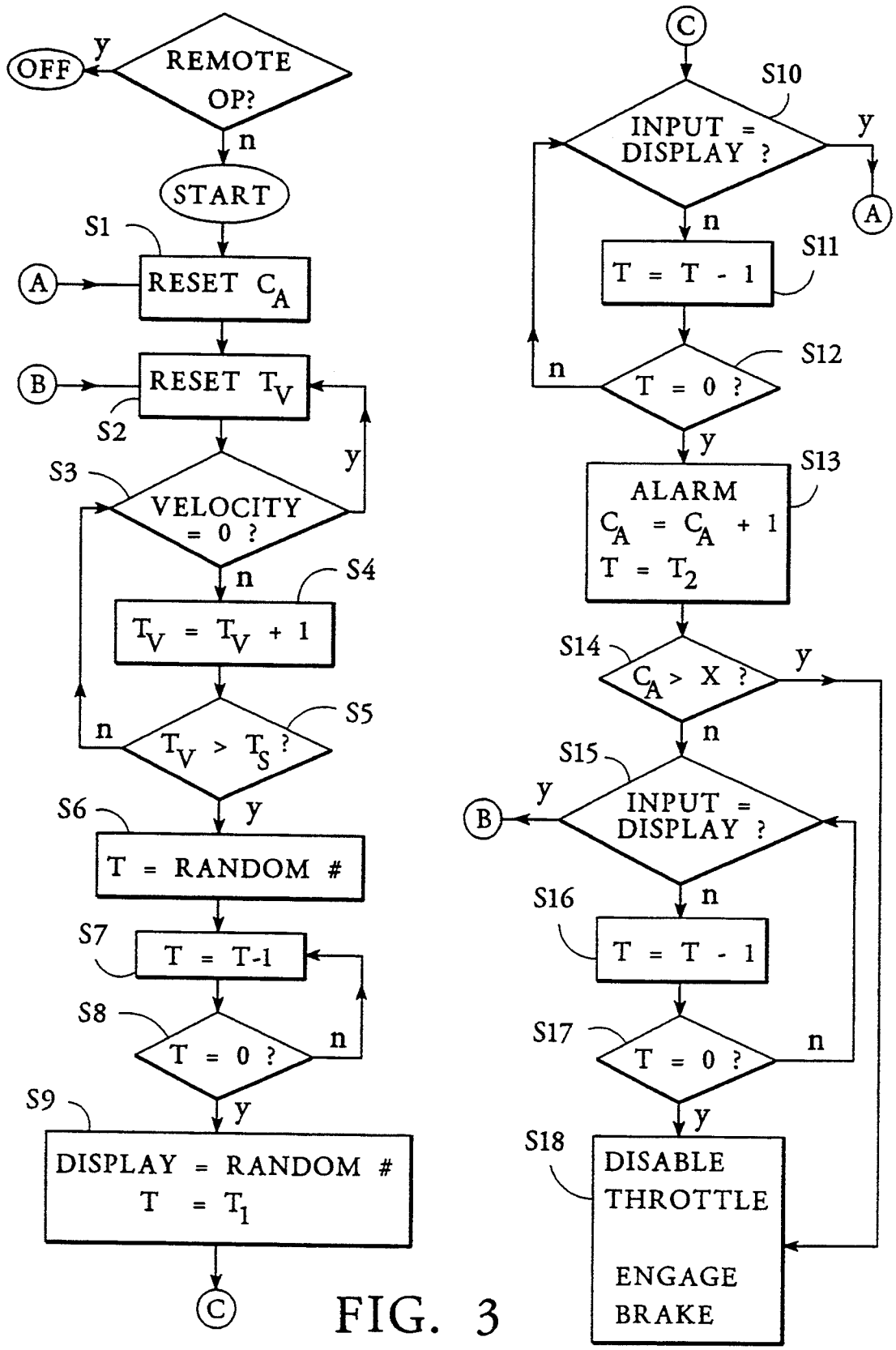
FIG. 3 is a flow chart of the operation of the alertness monitoring system of FIG. 1.

The operation of alertness monitoring system 10 will be described with reference to FIG. 3. Whenever the system is activated, it first determines if the vehicle is being remotely operated by checking the air brake cut-out valve sensor and remote throttle relay sensor. When either sensor indicates a positive condition the system is disabled in that vehicle. If the vehicle is under local control, the alarm counter $C_a$ is reset to zero in step 1 (S1) and the velocity timer $T_v$ is reset to zero in S2. In S3 the velocity supplied by speedometer 14 is checked. If the velocity equals zero, indicating that the vehicle has stopped, the system returns to S2 and $T_v$ is reset to zero. If the velocity does not equal zero $T_v$ is incremented in S4. In S5 the value in $T_v$ is compared with a predetermined value $T_s$ which is chosen to be indicative of continuous motion of the vehicle. If the value in $T_v$ is less than $T_s$ the system returns to S3 to check the velocity from speedometer 14.

When $T_v$ equals or exceeds $T_s$ the system loads a random number into a countdown timer T in S6. T is then decremented in S7. If T does not equal zero in S8, the system returns to S7. When T equals zero a predetermined number $T_1$ is loaded into T and a three-digit random number is displayed on screen 16 in S9. In S10 the input from keyboard 18 is compared with the random number displayed on screen 16. If the keyboard input corresponds to the displayed number, the system returns to S1 and resets the alarm counter. If the input does not correspond to the display, T is decremented in S11 and its value checked in S12. If T does not equal zero, the system returns to S10 to check the input.

If T reaches zero before the correct number has been input, $C_a$ is incremented, a second predetermined number $T_2$ is loaded into T and audio alarm 20 is sounded in S13. $C_a$ is checked against a preset limit on the number of consecutive alarms X in S14. When $C_a$ equals or exceeds X the system proceeds directly to S18 in which throttle relay 22 is disabled and brake control valve 28 engages brake 30. If $C_a$ is less than X the input from keyboard 18 is compared to the random numbers displayed on screen 16 in S15. If the correct numbers have been input the system returns to S12 where $T_v$ is reset. If the correct numbers have not been input T is decremented in S16 and checked for a zero value in S17. If the second time period $T_2$ has not expired the system returns to S15 and checks the input from keyboard 18 again. When T equals zero indicating that the second time period has expired throttle relay 22 is disabled and brake control valve 28 engages brake 30 in S18.

When throttle 24 is disabled and brake 30 engaged in response to a failure to input the correct numbers or an unacceptable number of consecutive alarms, computer module 12 monitors speedometer 14 and varies the application of braking force to bring the vehicle to a smooth stop. If the vehicle has not stopped within a predetermined time and distance computer module 12 activates brake control valve 28 in emergency mode, fully engaging brake 30. When the vehicle has been stopped by alertness monitoring system 10 the system must be manually reset before the vehicle can be restarted.

A major advantage of the present invention is that it requires the vehicle operator to perform tasks which require the level of alertness needed for safe operation of the vehicle. The forward sight line of the operator must be periodically scanned and variable visual information must be interpreted and correctly responded to. The task is simple enough to be performed by an alert operator without interfering with operation of the vehicle. Matching of a patterned visual input to an appropriate response is indicative of the level of alertness needed for safe operation of the vehicle.

The variation of testing interval and test stimulus also aid in maintaining the alertness of the vehicle operator. The system is therefore an aid in maintaining operator alertness as well as a control for preventing unsafe operation of the vehicle.

I claim:

1. A safety alertness monitoring system for a vehicle having an operator compartment, including an operator controlled throttle and a braking mechanism comprising:

first means for automatically producing a randomly generated symbol pattern at random intervals, the randomness of the intervals being independent of an operator input;

display means in said vehicle for showing said randomly generated symbol pattern to an operator;

key means for manually inputting a corresponding symbol pattern;

comparator means for determining if the corresponding symbol pattern matches the randomly generated symbol pattern, whereby a match indicates that the corresponding symbol pattern is a correct symbol pattern;

alarm means for producing a signal, discernible proximate said compartment, thereby signaling an expiration of a first predetermined time period following display of the randomly generated symbol pattern indicating that the correct symbol pattern was not entered into said key means before the expiration of said first predetermined time period; and control means for disabling said throttle and engaging said braking mechanism, if the correct symbol pattern is not entered within a second predetermined time period following said signal.

2. A safety alertness monitoring system for a vehicle having an operator compartment, including an operator controlled throttle and a braking mechanism comprising:

first means for automatically producing a randomly generated symbol pattern at random intervals, the randomness of the intervals being independent of an operator input;

display means in said vehicle for showing said randomly generated symbol pattern to an operator;

key means for manually inputting a corresponding symbol pattern;

comparator means for determining if the corresponding symbol pattern matches the randomly generated symbol pattern, whereby a match indicates that the corresponding symbol pattern is a correct symbol pattern;

alarm means for producing a signal, discernible proximate said compartment, thereby signaling an expiration of a first predetermined time period following display of the randomly generated symbol pattern indicating that the correct symbol pattern was not entered into said key means before the expiration of said first predetermined time period;

control means for disabling said throttle and engaging said braking mechanism, if the correct symbol pattern is not entered within a second predetermined time period following said signal; and means for sensing motion of said vehicle, thereby activating the system after said vehicle remains in motion for a predetermined amount of time, wherein said sensing means includes remote operation sensor means, said remote operation sensor means causing disablement of the system when said vehicle is remotely operated.

3. The system according to claim 2 further comprising enabling means for activating the throttle and disengaging the braking mechanism, said enabling means being inaccessible to an operator during operation of said vehicle.

4. A safety alertness monitoring system for a vehicle with an operator compartment, including a speedometer and an operator controlled throttle and a braking mechanism comprising:

timer means for measuring a first randomly generated time period, a second predetermined time period after said first randomly generated time period expires and a third predetermined time period after said second predetermined time period expires;

display means, being visible from within said compartment, for showing a randomly generated symbol pattern to an operator after said first randomly generated time period expires;

key means, being accessible from within said compartment, for inputting a corresponding symbol pattern;

comparator means for determining if the corresponding symbol pattern matches the randomly generated symbol pattern, whereby a match indicates that the corresponding symbol pattern is a correct symbol pattern;

alarm means for producing a signal, discernible proximate said compartment, thereby signaling an expiration of said second predetermined time period indicating that the correct symbol pattern was not entered into said key means before the expiration of said second predetermined time period;

means for counting the number of signals produced;

control means for inactivating the throttle and engaging the braking mechanism to bring the vehicle to a stop after said third predetermined time period is measured and the correct symbol pattern is not entered or if the counting means counts a predetermined number of signals;

means for resetting said timer means to measure a new randomly generated time period when the correct symbol pattern is entered before the third predetermined time period expires;

means for setting a number of signals counted by said counting means to zero when the correct symbol pattern is entered before the second predetermined time period expires; and means for sensing forward motion of said vehicle, thereby activating the system by causing said timer means to begin measuring said first time period when said vehicle is in forward motion for a predetermined amount of time, wherein said sensing means includes remote operation sensor means, said remote operation sensor means causing disablement of the system when said vehicle is remotely operated.

5. The system according to claim 4 further comprising enabling means for activating the throttle and disengaging the braking mechanism, said enabling means being inaccessible to said operator during operation of said vehicle.

* * * * *